US008331454B2

(12) United States Patent
Bjøntegaard et al.

(10) Patent No.: US 8,331,454 B2
(45) Date of Patent: Dec. 11, 2012

(54) INTEGER TRANSFORM FUNCTION FOR VIDEO COMPRESSION SYSTEMS

(75) Inventors: Gisle Bjøntegaard, Oppegård (NO); Arild Fuldseth, Lysaker (NO)

(73) Assignee: Cisco Technology, Inc., San Jose, CA (US)

( * ) Notice: Subject to any disclaimer, the term of this patent is extended or adjusted under 35 U.S.C. 154(b) by 821 days.

(21) Appl. No.: 12/268,842

(22) Filed: Nov. 11, 2008

(65) Prior Publication Data

US 2009/0122861 A1     May 14, 2009

(30) Foreign Application Priority Data

Nov. 12, 2007  (NO) .................................. 20075800

(51) Int. Cl.
*H04N 7/12* (2006.01)
(52) U.S. Cl. ................................. 375/240.18
(58) Field of Classification Search ............. 375/240.18, 375/240.19, 240.2
See application file for complete search history.

(56) References Cited

U.S. PATENT DOCUMENTS

| 5,519,503 | A  | * | 5/1996  | Ohki ............................ 386/353 |
| 2003/0156648 | A1 | * | 8/2003  | Holcomb et al. ........ 375/240.18 |
| 2005/0105611 | A1 |   | 5/2005  | Bjontegaard |
| 2005/0117810 | A1 |   | 6/2005  | Bjontegaard |
| 2007/0121729 | A1 | * | 5/2007  | Chen et al. ............... 375/240.18 |
| 2008/0089404 | A1 | * | 4/2008  | Okazaki et al. ............... 375/240 |
| 2008/0310512 | A1 | * | 12/2008 | Ye et al. .................... 375/240.16 |

FOREIGN PATENT DOCUMENTS

| JP | 6-45947 | 2/1994 |
| WO | WO 03/019787 A2 | 3/2003 |
| WO | WO 2008/085066 A2 | 7/2008 |

OTHER PUBLICATIONS

U.S. Appl. No. 12/987,246, filed Jan. 10, 2011, Bjontegaard, et al.
Extended European Search Report issued Jun. 27, 2011, in Patent Application No. 08850776.9.
Soo-Chang Pei, et al., "The Integer Transforms Analogous to Discrete Trigonometric Transforms", IEEE Transactions on Signal Processing, vol. 48, No. 12, XP 11059195, Dec. 2000, pp. 3345-3364.
Gisle Bjontegaard, "Coding improvement by using 4×4 blocks for motion vectors and transform", ITU-Telecommunications Standardization Sector, Study Group 16, Video Coding Experts Group, XP 30002727, Dec. 2-5, 1997, 6 pages.
Mathias Wien, "Variable Block-Size Transforms for H.264/AVC", IEEE Transactions on Circuits and Systems for Video Technology, vol. 13, No. 7, XP 11099253, Jul. 2003, pp. 604-613.
U.S. Appl. No. 13/290,665, filed Nov. 7, 2011, Bjontegaard, et al.
Japanese Office Action dated Mar. 6,2012 in corresponding Japanese Application Serial No. 2010-533029 (with translation).

* cited by examiner

*Primary Examiner* — Mark Rinehart
*Assistant Examiner* — Matthew Hopkins
(74) *Attorney, Agent, or Firm* — Oblon, Spivak, McClelland, Maier & Neustadt, L.L.P.

(57) ABSTRACT

The present invention is directed to video coding/decoding and discloses a method for transforming to/from transform coefficients and residual pixel data in moving pictures by a set of semi-orthonormal basis vectors. The basis vectors are derived from conventional DCT or KTL matrixes, but relaxes to some extend the requirements for orthogonality, norm equality and element size limitation. In this way the present invention provides improved coding efficiency and lower complexity compared to previously used integer transforms.

8 Claims, 2 Drawing Sheets

INTEGER TRANSFORM FUNCTION FOR VIDEO COMPRESSION SYSTEMS

CROSS-REFERENCE TO RELATED APPLICATIONS

This application claims priority to the Norwegian Patent Application with the Ser. No. 20075800 that was filed on Nov. 12, 2007, the entire contents thereof being hereinwith incorporated by reference.

FIELD OF THE INVENTION

The invention is related to video and decompression compression systems, and in particular to an integer transform function.

BACKGROUND OF THE INVENTION

Transmission of moving pictures in real-time is employed in several applications like e.g. video conferencing, net meetings, TV broadcasting and video telephony.

However, representing moving pictures requires bulk information as digital video typically is described by representing each pixel in a picture with 8 bits (1 Byte). Such uncompressed video data results in large bit volumes, and can not be transferred over conventional communication networks and transmission lines in real time due to limited bandwidth.

Thus, enabling real time video transmission requires a large extent of data compression. Data compression may, however, compromise with picture quality. Therefore, great efforts have been made to develop compression techniques allowing real time transmission of high quality video over bandwidth limited data connections. In video compression systems, the main goal is to represent the video information with as little capacity as possible. Capacity is defined with bits, either as a constant value or as bits/time unit. In both cases, the main goal is to reduce the number of bits.

The most common video coding method is described in the MPEG* and H.26* standards. The video data undergo four main processes before transmission, namely prediction, transformation, quantization and entropy coding. The prediction process significantly reduces the amount of bits required for each picture in a video sequence to be transferred. It takes advantage of the similarity of parts of the sequence with other parts of the sequence. Since the predictor part is known to both encoder and decoder, only the difference has to be transferred. This difference typically requires much less capacity for its representation. The prediction is mainly based on picture content from previously reconstructed pictures where the location of the content is defined by motion vectors. The prediction process is typically performed on square block sizes (e.g. 16×16 pixels). Note that in some cases, predictions of pixels based on the adjacent pixels in the same picture rather than pixels of preceding pictures are used. This is referred to as intra prediction, as opposed to inter prediction.

The residual represented as a block of data (e.g. 4×4 or 8×8 pixels) still contains internal correlation. A well-known method of taking advantage of this is to perform a two dimensional block transform. The ITU recommendation H.264 uses a 4×4 or 8×8 integer type transform. This transforms n×n pixels into n—n transform coefficients and they can usually be represented by fewer bits than the pixel representation. Transform of an n×n array of pixels with internal correlation will probability result in an n×n block of transform coefficients with much fewer non-zero values than the original n×n pixel block.

Direct representation of the transform coefficients is still too costly for many applications. A quantization process is carried out for a further reduction of the data representation. Hence the transform coefficients undergo quantization. The possible value range of the transform coefficients is divided into value intervals each limited by an uppermost and lowermost decision value and assigned a fixed quantization value. The transform coefficients are then quantified to the quantization value associated with the intervals within which the respective coefficients reside. Coefficients being lower than the lowest decision value are quantified to zeros. It should be mentioned that this quantization process results in that the reconstructed video sequence is somewhat different compared to the uncompressed sequence.

Summarized, a digital video picture is exposed to the following steps:

Divide the picture into square blocks of pixels, for instance 16×16 or 8×8 pixels. This is done for luminance information as well as for chrominance information.

Produce a prediction for the pixels in the block. This may be based on pixels in an already coded/decoded picture (called inter prediction) or on already coded/decoded pixels in the same picture (intra prediction).

Form a difference between the pixels to be coded and the predicted pixels. This is often referred to as a residual.

Perform a two dimensional transformation of the residual resulting in a representation as transform coefficients.

Perform a quantization of the transform coefficients. This is the major tool for controlling the bit production and reconstructed picture quality.

Establish a scanning of the two dimensional transform coefficient data into a one dimensional set of data.

Perform lossless entropy coding of the quantized transform coefficients.

The above steps are listed in a natural order for the encoder. The decoder will to some extent perform the operations in the opposite order and do "inverse" operations as inverse transform instead of transform and de-quantization instead of quantization.

SUMMARY OF THE INVENTION

The features of the present invention defined in the independent claims enclosed characterize this method. One aspect of the present invention provides a method of video coding for transforming a first block of residual pixel values of a moving picture by a transform matrix formed by a number of basis vectors generating a corresponding second block of transform coefficients, wherein the transform matrix is preferably derived from a DCT or a KLT, the basis vectors are close to, but not exactly, orthogonal, the norms of the basis vectors have preferably a deviation less than 1%, and the elements of the basis vectors are less than 32. In another aspect of the present invention, a corresponding inverse method for video decoding is provided.

BRIEF DESCRIPTION OF THE DRAWINGS

These and other features, aspects and advantages of the present invention will become better understood with regard to the following description, appended claims and accompanying drawings where:

DETAILED DESCRIPTION OF THE PRESENT INVENTION

Figure 1:
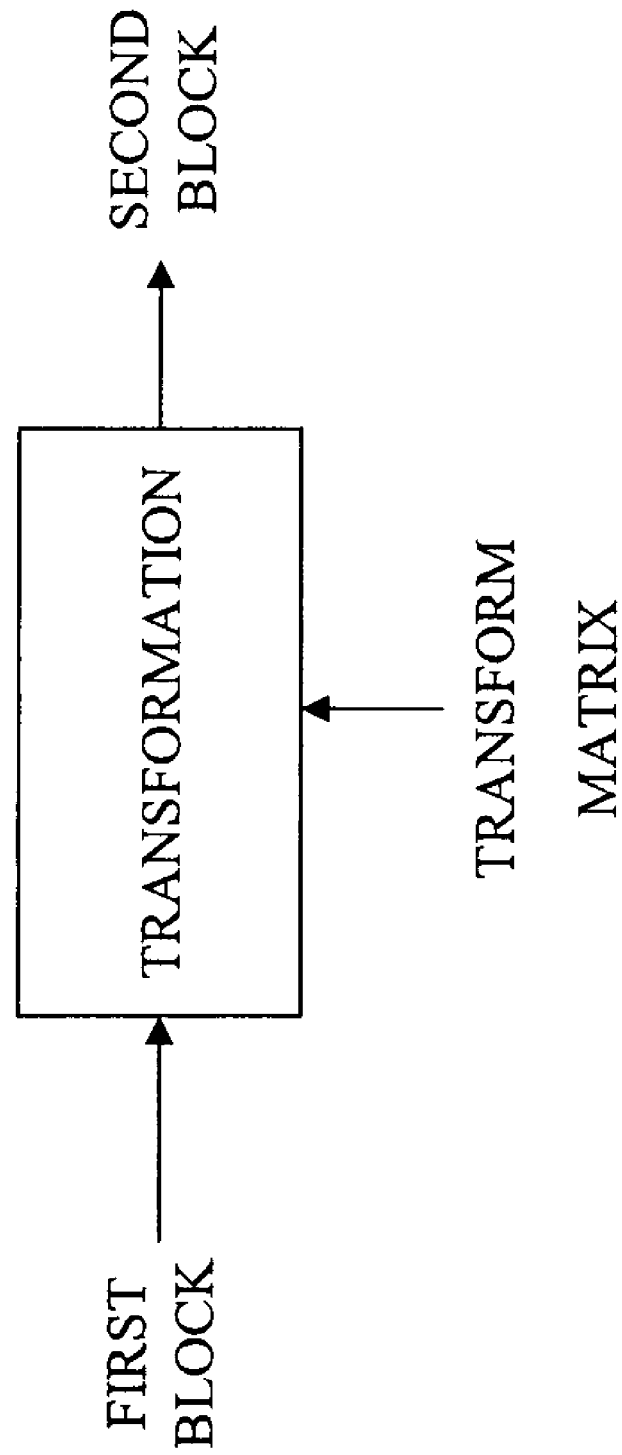
FIG. 1 shows a diagram representing the transforming of the method according to the present invention.

The present invention relates to the transform part of the coding process described in the background section. Thus, a more thorough review of the transform process will be reviewed.

Most of the conventional video standards produce block based residuals that undergo a two dimensional transform on the encoding side and a corresponding inverse transform on the decoding side, and separable transforms are usually used. This means that a one dimensional transform is first performed in one direction (e.g. horizontal) followed by the same one dimensional transform being used on the result in the other direction. Hence only one dimensional transforms have to be defined and used.

In the standards H.261, H.263, H.264 and the corresponding MPEG standards, 8 point Discrete Cosine Transform (DCT) is used. According to signal theory DCT is close to an optimal transform if the correlation between neighbouring pixels in the residual signal is relatively high. The DCT is defined as 8 real valued basis vectors as listed below with 3 digits accuracy:

| 0.354 | 0.354  | 0.354  | 0.354  | 0.354  | 0.354  | 0.354  | 0.354  |
|-------|--------|--------|--------|--------|--------|--------|--------|
| 0.490 | 0.416  | 0.278  | 0.098  | -0.098 | -0.278 | -0.416 | -0.490 |
| 0.462 | 0.191  | -0.191 | -0.462 | -0.462 | -0.191 | 0.191  | 0.462  |
| 0.416 | -0.098 | -0.490 | -0.278 | 0.278  | 0.490  | 0.098  | -0.416 |
| 0.354 | -0.354 | -0.354 | 0.354  | 0.354  | -0.354 | -0.354 | 0.354  |
| 0.278 | -0.490 | 0.098  | 0.416  | -0.416 | -0.098 | 0.490  | -0.278 |
| 0.191 | -0.462 | 0.462  | -0.191 | -0.191 | 0.462  | -0.462 | 0.191  |
| 0.098 | -0.278 | 0.416  | -0.490 | 0.490  | -0.416 | 0.278  | -0.098 |

These basis vectors are said to be orthonormal, which means that each vector is orthogonal to all the other vectors, in addition to that the norm, or square sum along each line is equal to 1.

Defining now the above matrix of data $T(i,j)$, $i,j=0-7$. $i$ indicates the column number and $j$ indicates row number. Assuming further that there is a set of 8 pixel values $f(i)$ of an 8×8 block to be transformed into 8 transform values $F(j)$. The following relations then apply:

$$F(j) = \sum_{i=0,7} f(i) * T(i, j), j = 0 - 7$$

Inverse transform or reconstruction of the pixels:

$$f(i) = \sum_{j=0,7} F(j) * T(i, j), i = 0 - 7$$

The transform is then normally preformed on each set of 8 pixel values of the 8×8 block, and then the whole procedure is repeated on the result vertically with the same transform matrix.

This transform performs well, but it is a disadvantage that it is based on real number representation. In implementation this will inevitably result in some inaccuracy. This inaccuracy will be slightly different for different implementations using different internal representations of real numbers. This may lead to mismatch between different reconstruction procedures. The implementation is also relatively complex. For these reasons it is desirable to use transforms that are described by integer numbers only. The orthonormal conditions defined above are still desirable. With integer numbers it is impossible to obtain the condition that "the square sum along each line is equal to 1". It is therefore more realistic and feasible to change the requirement of the norm to be the same for all vectors, but still maintaining the first requirement that each vector shall be orthogonal to all the other vectors.

An example of basis vectors satisfying the last-mentioned requirements are the Walsh Hadamard vectors. 8 point Hadamard vectors are as follows:

| 1 | 1  | 1  | 1  | 1  | 1  | 1  | 1  |
|---|----|----|----|----|----|----|----|
| 1 | 1  | 1  | 1  | -1 | -1 | -1 | -1 |
| 1 | 1  | -1 | -1 | -1 | -1 | 1  | 1  |
| 1 | 1  | -1 | -1 | 1  | 1  | -1 | -1 |
| 1 | -1 | -1 | 1  | 1  | -1 | -1 | 1  |
| 1 | -1 | -1 | 1  | -1 | 1  | 1  | -1 |
| 1 | -1 | 1  | -1 | -1 | 1  | -1 | 1  |
| 1 | -1 | 1  | -1 | 1  | -1 | 1  | -1 |

However, this transform turns out to have other drawbacks and is therefore not very much used.

A better and expanded set of requirements for integer transforms is found to be as follows:
1. The vectors shall be orthogonal.
2. The numbers used to define the vectors are small—typically less than 32.
3. The shape of the vectors are as close as possible to the corresponding DCT.
4. The norm, or square sum along each line shall be the same for all vectors.

It is difficult to satisfy all the requirements—especially for larger transforms. The above requirements can therefore be considered to be listed in prioritized order. Traditionally, 1 and 2 have been considered to be mandatory, 3 may be only partly fulfilled whereas 4 may be worked around with some added complexity in the implementations.

In the early development of H.264 the following transform was used:

| 13 | 13  | 13  | 13  |
|----|-----|-----|-----|
| 17 | 7   | -7  | -17 |
| 13 | -13 | -13 | 13  |
| 7  | -17 | 17  | -7  |

This vector set satisfied requirements 1, 2, 3, 4 above. The recent H.264 and MPEG AVC standards use both 4 point and 8 point integer transforms. As for the 4 point transform, the basis vectors are:

| 1 | 1  | 1  | 1  |
|---|----|----|----|
| 2 | 1  | -1 | -2 |
| 1 | -1 | -1 | 1  |
| 1 | -2 | 2  | -1 |

This vector set fulfils requirements 1, 2 and partly 3 above. As for the 8 point transform, the basis vectors are:

| 1  | 1  | 1  | 1  | 1  | 1   | 1   | 1   |
|----|----|----|----|----|-----|-----|-----|
| 12 | 10 | 6  | 3  | -3 | -6  | -10 | -12 |
| 2  | 1  | -1 | -2 | -2 | -1  | 1   | 2   |

-continued

| 10 | -3  | -12 | -6  | 6   | 12  | 3   | -10 |
| 1  | -1  | -1  | 1   | 1   | -1  | -1  | 1   |
| 6  | -12 | 3   | 10  | -10 | -3  | 12  | -6  |
| 1  | -2  | 2   | -1  | -1  | 2   | -2  | 1   |
| 3  | -6  | 10  | -12 | 12  | -10 | 6   | -3  |

This vector set also satisfies requirements 1, 2 and partly 3. Experience has shown that it is still possible to reduce the requirements even further to improve coding efficiency and reduce the complexity without compromising with picture quality. The requirements for the transform are modified from above:
1. The shape of the vectors are as close as possible to the optimal transform. Depending on the statistics of the signal to be coded this may be DCT or a Karhunen-Loeve (KLT) transform based on the statistics of the signal.
2. The numbers used to define the vectors are small—say <32.
3. The vectors may not be exactly orthogonal, but very close.
4. The norm of the vectors may not be exactly the same, but very close.

With the relaxed requirements 3 and 4 there is more room for improving on especially requirement 1. The inventors realized that the relaxations on 3 and 4 may be small enough so that the encoding/decoding performance is practically the same as if 3 and 4 were completely fulfilled.

The present invention provides a design of transform vector sets with slightly relaxed requirements 3 and 4 resulting in better coding performance mainly due to better fulfillment of requirement 1. The basis vectors have shape close to a corresponding DCT or KLT, and at the same time norms that are similar but not necessarily exactly equal with a deviation less than 1%. In addition, the basis vectors are close to orthogonal but not exactly orthogonal, and the numbers used to specify the set of transform vectors are small, and less than or equal to 32.

A first step for approaching a set of transform vectors according to the present invention is to make an integer version of the DCT vectors by multiplying the DCT vectors by 26*√2 and rounding to the nearest integer. The result would be as follows, with the square sum to the right of each row:

| 13 | 13  | 13  | 13  | 13  | 13  | 13  | 13  | 1352 |
| 18 | 15  | 10  | 4   | -4  | -10 | -15 | -18 | 1330 |
| 17 | 7   | -7  | -17 | -17 | -7  | 7   | 17  | 1352 |
| 15 | -4  | -18 | -10 | 10  | 18  | 4   | -15 | 1330 |
| 13 | -13 | -13 | 13  | 13  | -13 | -13 | 13  | 1352 |
| 10 | -18 | 4   | 15  | -15 | -4  | 18  | -10 | 1330 |
| 7  | -17 | 17  | -7  | -7  | 17  | -17 | 7   | 1352 |
| 4  | -10 | 15  | -18 | 18  | -15 | 10  | -4  | 1330 |

The square sum indicates that the norm is not identical for all vectors. However, as a second step for approaching a set of transform vectors according to the present invention, a slight modification of the numbers can make the norm of each vector much closer to each other, and close enough to be considered to have equal norm. An approximate orthogonality between vectors, close enough to be considered as orthogonal can also be obtained, in addition to a shape of the vectors very close to the DCT can also be obtained by a slight modification of the numbers.

The inventors have obtained the following set of vectors as an example of an appropriate transform according to the present invention (the number on the right side of each row is the square sum of the respective vector):

| 13 | 13  | 13  | 13  | 13  | 13  | 13  | 13  | 1352 |
| 17 | 16  | 11  | 3   | -3  | -11 | -16 | -17 | 1350 |
| 17 | 7   | -7  | -17 | -17 | -7  | 7   | 17  | 1352 |
| 16 | -3  | -17 | -11 | 11  | 17  | 3   | -16 | 1350 |
| 13 | -13 | -13 | 13  | 13  | -13 | -13 | 13  | 1352 |
| 11 | -17 | 3   | 16  | -16 | -3  | 17  | -11 | 1350 |
| 7  | -17 | 17  | -7  | -7  | 17  | -17 | 7   | 1352 |
| 3  | -11 | 16  | -17 | 17  | -16 | 11  | -3  | 1350 |

In the decoding process, to obtain residual pixels from transform coefficients, the inverse set of vectors are used, i.e. the transpose of the set of vectors above is used.

FIG. 1 illustrates the method of video coding or decoding of the present invention in a schematic representation. A first block of residual pixel values can be subjected to a transformation by a transform matrix formed by a number of basis vectors, to generate a corresponding second block of residual pixel values of a moving picture. For the transformation, a transform matrix is used, as described above. The invention is applicable to any transform size. It is also not limited to close approximation to DCT. The approximation may be to other optimal basis vectors like the KLT.

Figure 2:
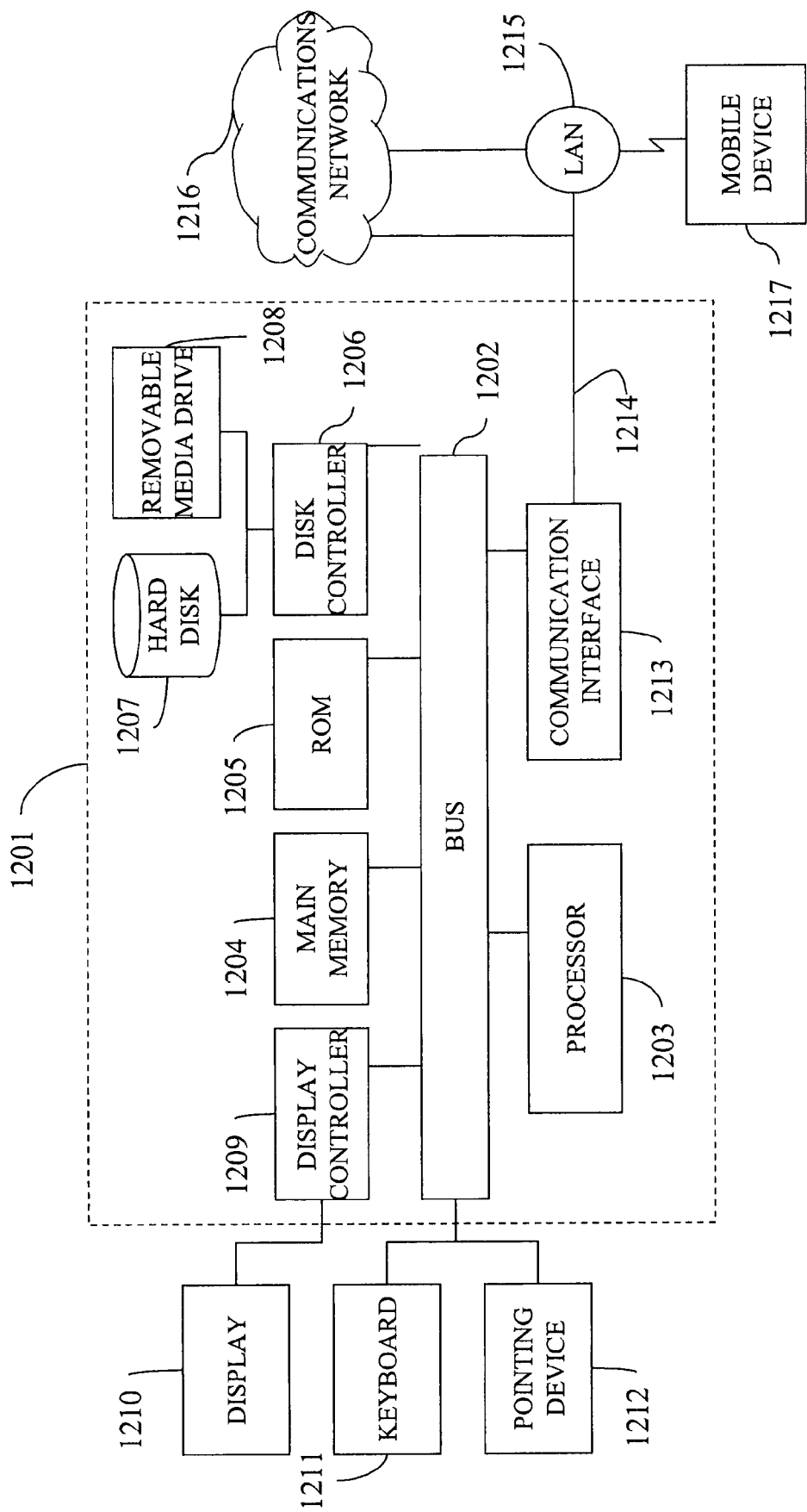
FIG. 2 shows a schematic view of an exemplary image processing device that can be used to perform or implement the method of the present invention.

FIG. 2 illustrates a computer system 1201 upon which the method of video coding or decoding of the present invention may be implemented. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203 for the coding or encoding. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203. The transformation can be performed on the processor 1203 by using the main memory 1204 for data storage during processing.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA). The storage devices can be used to store results of the coding/decoding or data that has to be transformed, and to store the basic vectors of the transform matrix.

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)). With such special purpose logic devices, the transformation with the transform matrix can be hardware-coded to speed up the encoding or coding of the moving pictures, and to reduce the processing required on processor 1203.

The computer system 1201 may also include a display controller 1209 coupled to the bus 1202 to control a display 1210, such as a cathode ray tube (CRT), for displaying information to a computer user. Results of the coding or decoding of a moving picture can be displayed on display 1210. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the transformation in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions, as described above with respect to the special purpose logic devices. Thus, embodiments are not limited to any specific combination of hardware circuitry and software.

As stated above, the computer system 1201 includes at least one computer readable medium or memory for holding instructions programmed according to the teachings of the invention and for containing data structures, tables, records, or other data described herein. For example the basic vectors and moving pictures that have to be coded or decoded can be stored on such computer readable media. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1201, for driving a device or devices for implementing the method of video coding or decoding, and for enabling the computer system 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the method of video coding or decoding remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information. For example, the communication interface 1213 can be used to output coded moving pictures resulting from the method of video coding, or to input encoded moving pictures to process them with the method for decoding.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. It is possible to deliver coded video data that was coded by the method of the present invention to external devices, in an MPEG* or H.26* standard, for example a mobile device 1217, or other terminal devices connected to network 1216. Due to the data reduction by encoding, the required bandwidth could be reduced. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The present invention is useful to design integer transforms for image and video coding with improved coding efficiency and lower complexity compared to previously used integer transforms.

Although the invention herein has been described with reference to a particular embodiment, it is to be understood that this embodiment is merely illustrative of the principles and applications of the present invention. It is therefore to be understood that numerous modifications may be made to the illustrative embodiment and that other arrangements may be devised without departing from the spirit and scope of the present invention as defined by the appended claims.

The invention claimed is:

1. A method comprising:
   transforming, by a processor, a first block of residual pixel values of a moving picture by a transform matrix formed by a number of basis vectors generating a corresponding second block of transform coefficients, the basis vectors being rows of the transform matrix,
   wherein the transform matrix is derived from a Discrete Cosine Transform (DCT) or a Karhunen-Loeve Transform (KLT), at least one pair of the basis vectors being non-orthogonal, norms of all the basis vectors have a deviation less than 1% and elements of the basis vectors are less than 32, each norm being a square sum of terms included in only one row, respectively, in the transform matrix, said transform matrix being an integer transform matrix.

2. The method according to claim 1,
   wherein the basis vectors are used respectively in horizontal and vertical direction of the first block of residual pixel values to generate the corresponding second block of transform coefficients.

3. The method according to claim 1,
   wherein the blocks represent a first squared area of 8×8 pixels in a picture.

4. The method according to claim 3,
   wherein said basis vectors are defined as:

$$\begin{matrix}
[13 & 13 & 13 & 13 & 13 & 13 & 13 & 13] \\
[17 & 16 & 11 & 3 & -3 & -11 & -16 & -17] \\
[17 & 7 & -7 & -17 & -17 & -7 & 7 & 17] \\
[16 & -3 & -17 & -11 & 11 & 17 & 3 & -16] \\
[13 & -13 & -13 & 13 & 13 & -13 & -13 & 13] \\
[11 & -17 & 3 & 16 & -16 & -3 & 17 & -11] \\
[7 & -17 & 17 & -7 & -7 & 17 & -17 & 7] \\
[3 & -11 & 16 & -17 & 17 & -16 & 11 & -3].
\end{matrix}$$

5. A method comprising: transforming, by a processor, a first block of transform coefficients by a transform matrix formed by a number of basis vectors generating a corresponding second block of residual pixel values of a moving picture, the basis vectors being horizontal rows of the transform matrix,
   wherein the transform matrix is derived from a Discrete Cosine Transform (DCT) or a Karhunen-Loeve Transform (KLT), at least one pair of the basis vectors being non-orthogonal, norms of all the basis vectors have a deviation less than 1% and elements of the basis vectors are less than 32, each norm being a square sum of terms included in only one row, respectively, in the transform matrix, said matrix being an integer transform matrix.

6. The method according to claim 5,
   wherein the basis vectors are used respectively in horizontal and vertical direction of the first block of transform coefficients to generate the corresponding second block of residual pixel values.

7. The method according to claim 5,
   wherein the blocks represent a first squared area of 8×8 pixels in the moving picture.

8. The method according to claim 7,
   wherein said basis vectors are defined as:

$$\begin{matrix}
[13 & 13 & 13 & 13 & 13 & 13 & 13 & 13]^T \\
[17 & 16 & 11 & 3 & -3 & -11 & -16 & -17]^T \\
[17 & 7 & -7 & -17 & -17 & -7 & 7 & 17]^T \\
[16 & -3 & -17 & -11 & 11 & 17 & 3 & -16]^T \\
[13 & -13 & -13 & 13 & 13 & -13 & -13 & 13]^T \\
[11 & -17 & 3 & 16 & -16 & -3 & 17 & -11]^T \\
[7 & -17 & 17 & -7 & -7 & 17 & -17 & 7]^T \\
[3 & -11 & 16 & -17 & 17 & -16 & 11 & -3]^T.
\end{matrix}$$

* * * * *